(No Model.)
C. P. GROUT.
DENTAL TOOL FOR PREPARING ROOTS FOR CROWNS.
No. 319,237. Patented June 2, 1885.
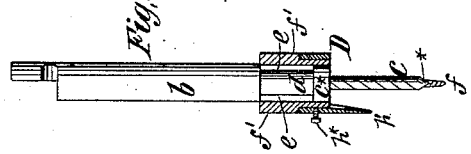
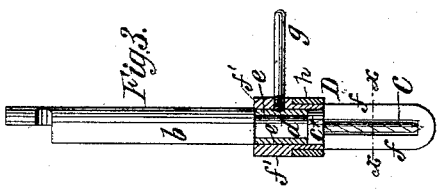
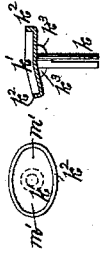
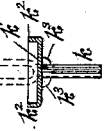
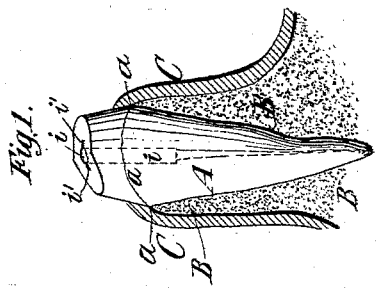
Witnesses:
Henry Hill
Matthew Pollock.
Inventor:
Charles P. Grout
By his Attys.
Brown & Hall

UNITED STATES PATENT OFFICE.

CHARLES P. GROUT, OF NEW YORK, N. Y.

DENTAL TOOL FOR PREPARING ROOTS FOR CROWNS.

SPECIFICATION forming part of Letters Patent No. 319,237, dated June 2, 1885.

Application filed February 4, 1885. (No model.)

*To all whom it may concern:*

Be it known that I, CHARLES P. GROUT, of the city and county of New York, in the State of New York, have invented a new and useful Improvement in Dental Tools for Preparing Roots for Crowns, of which the following is a specification.

Artificial tooth-crowns are now largely made in the form of metal caps closed at the top, and having either a solid metal top or a porcelain-faced top. The band portion of such a crown is fitted to the stump or root to a point below the gum, and at or near the alveolar border or ridge, near which point the tooth-enamel ends. After the crown is fitted it is usually partly filled with cement and then pressed down into position on the previously-prepared root.

The invention consists in a tool of novel construction, as hereinafter described, whereby tooth roots or stumps may be expeditiously and accurately shaped or trimmed to a true taper from a point at or near the alveolar border outward.

In the accompanying drawings, Figure 1 is a perspective view of a trimmed or shaped tooth-root and a sectional view of the gum-tissue and alveolar process to illustrate the work to be performed by my tool. Fig. 2 is an exterior view of a tool which embodies my invention. Figs. 3 and 3* are longitudinal sections of the tool in planes at right angles to each other. Fig. 4 is a similar section of parts of a tool of slightly-modified form, also embodying my invention. Fig. 5 is a transverse section of the tool on the dotted line *x x*, Fig. 3. Fig. 6 represents an appliance, hereinafter described, which I use with the tool shown in Figs. 2 and 3. Figs. 7 and 8 are respectively an axial section and a plan of another appliance which I employ with the tool shown in Figs. 2 and 3, and Fig. 7* is a sectionl view slightly different from Fig. 7.

All the figures are drawn upon an enlarged scale to more clearly illustrate the invention, and similar letters of reference designate corresponding parts in the several figures.

A, Fig. 1, designates the root of a tooth shaped or trimmed by my improved tool.

B designates the alveolar process or jaw-bone, and *a* the point where the alveolar terminates, and which is further represented by a line, *a*, around or across the root.

C designates the gum-tissue, which projects above or beyond the alveolar border *a*, and laps on or overlies the portion of the root which is exposed above the alveolar border *a*.

By tools hereinafter described I trim or shape the exposed portion of the root to a true taper from the alveolar border *a*, cutting away enough of the root or the enamel thereof to give the exposed portion the desired taper. It will be readily seen that if the profile of the lower edge of the crown-band is such as to conform to the shape or contour of the alveolar border around the root, the band will come down or may be pressed down on the taper root to a point where the taper commences and the cutting away of the root was commenced. There will then be no shoulder against which the band will abut; but the band will come down to a point where the enamel of the tooth terminated, and will, so to speak, form an artificial enamel, the shape of the root and the edge portion of the band conforming approximately to the shape which the natural enamel and root had at the alveolar border.

I will now refer particularly to Figs. 2, 3, 3*, 4, and 5, which represent my improved tool, which may be used for shaping or trimming the exposed portion of roots, as shown in Fig. 1.

The tool proper or cutting-instrument, D, has a shank, *b*, whereby it may be secured in the hand-piece of a dental engine or other holder, and its lower portion, *c*, for some distance from its end, is spirally grooved or fluted; or it may have straight grooves or flutes, so that it forms a facing-cutter. Above the cutting portion *c* it is reduced in diameter, so as to form a contracted neck, *d*, on which is fitted a collar or sleeve, *e*, within which the drill or tool may turn freely. This collar or sleeve may be made in various ways. It may be split and spread very slightly to pass over the little collar *c**, forming the lower end of the neck *d;* or it may consist of two half or semicircular boxes or sections.

If desired, in lieu of turning down a neck, *d*, in the tool, I may fit the end or plain portion of the cutter itself into a socket in a shank, $b^*$, which consists of a separate piece, and the collar $c^*$ may also be a separate piece and driven or soldered on the cutter. In that case a solid collar or sleeve, $e$, may be used, as in Fig. 4, and the end of the cutter be inserted and driven or soldered in the socketed end of the shank $b^*$ after the sleeve $e$ is placed thereon. The cutter $c$ performs its work when pressed with its fluted portion against the root, and to regulate the depth of the cut I employ a gage or guard, $f$, which projects from a collar or sleeve, $f'$, which is fitted upon the sleeve or collar $e$ and secured thereto by a set-screw or screwed pin, $g$, or otherwise. This guard $f$ is cut away at the opposite sides sufficiently to expose the cutting portion $c$ of the tool, and its end is flattened or wedge-shaped, to enable it to readily pass under the gum and to the alveolar border $a$. The end of the cutter is pointed or conical at *, and has a conical bearing in the bottom of the guard, as shown in Fig. 3*, the guard forming a stirrup springing from the collar or sleeve $f'$.

In some cases the tool may be wanted for cutting surfaces which are rounded or curved in a direction around the tooth, while in other cases it will be advantageous to employ it for cutting approximately straight faces. To the end that it may serve either purpose, I make the guard $f$ concave on one side, as shown at $f^*$, Fig. 5, and straight or flat on the other side, as shown at $f^{**}$ in said figure. In using this tool the edge of the guard $f$ may rest upon and be run along the alveolar border $a$, the latter forming a guide; or I may employ a guide such as is shown in Figs. 2 and 3*. This guide consists of a collar or sleeve, $h$, secured on the exterior of the collar $f'$ by a set-screw, $h^*$, and having a downwardly-projecting lip, $h'$, which projects below the sleeve $f'$. This lip or projection may be traversed along the top of the root if it be not too irregular by reason of decay, and will form a guide for the cutting implement.

From the above description it will be understood that the guard $f f'$ and all its appurtenances, with the collar $e$, may be held stationary while the cutter $c$ rotates rapidly in them; but if not held they will partake of the same rotary motion until held by pressing the guard $f$ against a tooth-root. To prevent their rotation while operating on a tooth, and before the guard is actually against the tooth or when eased upon or removed for an instant, I insert in a socket, $i$, in the tooth-root, which is formed by drilling out the nerve-canal for a little distance, a split peg, $j$, such as shown in Fig. 6, and which has a fork, $j'$. The screwed pin or set-screw $g$ of the tool rests in this fork and prevents the guard from turning.

In many cases the exposed portion of the root will be badly decayed, and the lip $h'$ cannot be traversed along the top of the root to form a guide for the tool. In such cases I may employ a former. (Shown in Figs. 7, 7*, and 8.) This consists of a split tube or peg, $k$, having at the top a small plate, $k'$, of about the shape of the cross-section to which the root is to be finished. This plate has around the edge a raised border, $k^2$, with which the lip $h'$ may be engaged. The plate shown has also wings or fins $k^3$ at its junction with the stem or peg $k$. If this appliance is to be used, I make little nicks or slots $i'$ in the socket $i$, as shown in Fig. 1. The tube or peg $k$ is then inserted in the socket $i$, and the fins $k^3$, entering the nicks $i'$, hold it against turning. The lip $h'$ of the tool is then engaged with the flange $k^2$ and traversed along it, the plate forming a former or guide for the tool. A groove in the plate $k'$ will answer the same purpose as the flange $k^2$. The surface of the plate $k'$ may be straight, as in Fig. 7, or angular, as in Fig. 7*.

What I claim as my invention, and desire to secure by Letters Patent, is—

1. The combination, with a facing-cutter, $c$, of the guard therefor, within which the cutter may rotate, and which is cut away at the side to expose the cutter to the depth which it is desired to cut, substantially as herein described.

2. The combination, with a facing-cutter, $c$, of a guard therefor, within which the cutter may rotate, and which is cut away at the side to expose the cutter, and has at the end a bearing to which the end of the cutter is fitted, substantially as herein described.

3. The combination, with a facing-cutter, $c$, of a guard therefor, within which the cutter may rotate, and which is cut away at the side to form a concave surface beyond which the cutter is exposed, substantially as herein described.

4. The combination, with a facing-cutter, $c$, of a guard therefor, within which the cutter may rotate, and which is cut away at opposite sides to form a concave surface and a straight surface, beyond both of which the cutter is exposed, substantially as herein described.

5. The combination, with a facing-cutter, $c$, having a neck of reduced diameter, of a collar loose on said neck and a guard for the cutter secured upon said collar and cut away at the side to expose the cutter, substantially as herein described.

6. The combination, with a facing-cutter, $c$, and a shank, $b^*$, having a socket, within which the plain end of the cutter is removably secured, of a collar, $c^*$, on the cutter, a solid collar or sleeve fitting loosely between the collar and end of the shank, and a guard secured on the collar or sleeve and cut away at the side to expose the cutter, substantially as herein described.

7. The combination, with a facing-cutter, $c$, and a guard therefor, within which the cutter may rotate, and which is cut away at the side to expose the cutter, the guard having a laterally-projecting arm, of a pin or peg adapted to enter a socket in a tooth-root and forked to receive said arm and prevent the guard from turning with the cutter, substantially as herein described.

8. The combination, with a facing-cutter, c, and a guard therefor, within which the cutter may turn, and which has a lip or projection, h', of a pin or peg to enter a socket in a tooth-root, and which is surmounted by a plate or flange, along which the said lip or projection may be traversed to guide the tool, substantially as herein described.

CHAS. P. GROUT.

Witnesses:
FREDK. HAYNES,
MATTHEW POLLOCK.